US006931254B1

(12) United States Patent
Egner et al.

(10) Patent No.: US 6,931,254 B1
(45) Date of Patent: Aug. 16, 2005

(54) PERSONALIZED PRESENTATION SYSTEM AND METHOD

(75) Inventors: Will A. Egner, Allen, TX (US); Radhika Gottipati, Richardson, TX (US); Vibhu Sawhney, Richardson, TX (US); Scott O. Kaylor, McKinney, TX (US); Cesar G. Heyaime, Dallas, TX (US)

(73) Assignee: Nortel Networks Limited, St. Laurent (CA)

( * ) Notice: Subject to any disclaimer, the term of this patent is extended or adjusted under 35 U.S.C. 154(b) by 520 days.

(21) Appl. No.: 09/675,997

(22) Filed: Sep. 29, 2000

Related U.S. Application Data (60) Provisional application No. 60/227,053, filed on Aug. 21, 2000.

(51) Int. Cl.$^7$ ................................................. H04Q 7/00
(52) U.S. Cl. ............................... 455/456.3; 455/456.1; 701/200; 701/207; 705/14; 705/26
(58) Field of Search ............................. 455/456.1, 457, 455/558, 566, 456; 701/200, 207, 211, 213, 216, 300; 342/357.01, 457; 340/825.72, 988; 235/380, 383; 705/14, 26

(56) References Cited

U.S. PATENT DOCUMENTS 5,086,394 A * 2/1992 Shapira ........................... 705/1
5,526,133 A * 6/1996 Paff ............................ 386/117

(Continued)

OTHER PUBLICATIONS

S. Deering et al., Network Working Group, Request for Comments: 2460, Internet Protocol, Version 6 (IPv6) Specification, pp. 1–35 (Dec. 1998).
Information Sciences Institute, Request for Comments: 791, Internet Protocol, DARPA Internet Program Protocol Specification, pp. 1–46 (Sep. 1981).
R. Fielding et al., Network Working Group, Request for Comments: 2068, Hypertext Transfer Protocol—HTTP/1.1, pp. 1–142 (Jan. 1997).

*Primary Examiner*—William Trost
*Assistant Examiner*—James D Ewart
(74) *Attorney, Agent, or Firm*—Trop, Pruner & Hu, P.C.

(57) ABSTRACT

A communications system includes a facility that has a tracking system and a central control system. The tracking system tracks locations of users within the facility. Based on the locations of such users and their user profiles, targeted advertising information (and other types of information) may be presented on displays or other presentation devices in the proximity of each user. Also, user activity within the facility may be tracked, including purchases made by the users and visits to various retail outlets. Such information is collected, which can be used to update the profile the user or communicated to entities, such as retail entities, that are interested in the collected information. Also, to enable virtual visits to the facility, cameras are dispersed throughout the facility. A remote user can thus perform a virtual visit of the facility by viewing images collected by the cameras. Also, a remote user may choose to accompany a companion that is physically in the facility. The location of the companion may be tracked so that video images of the companion's environment may be collected and transmitted back to the remote user.

30 Claims, 7 Drawing Sheets

U.S. PATENT DOCUMENTS

| | | | | |
|---|---|---|---|---|
| 5,572,653 | A | * 11/1996 | DeTemple et al. | 345/501 |
| 5,923,364 | A | * 7/1999 | Rhodes et al. | 348/159 |
| 5,926,209 | A | * 7/1999 | Glatt | 348/143 |
| 5,956,081 | A | * 9/1999 | Katz et al. | 348/163 |
| 6,091,956 | A | * 7/2000 | Hollenberg | 455/456 |
| 6,123,259 | A | * 9/2000 | Ogasawara | 235/380 |
| 6,237,145 | B1 | * 5/2001 | Narasimhan et al. | 725/23 |
| 6,359,647 | B1 | * 3/2002 | Sengupta et al. | 348/154 |
| 6,397,040 | B1 | * 5/2002 | Titmuss et al. | 455/67.11 |
| 6,401,032 | B1 | * 6/2002 | Jamison et al. | 701/207 |
| 6,460,848 | B1 | * 10/2002 | Soltys et al. | 273/149 R |
| 6,513,015 | B2 | * 1/2003 | Ogasawara | 705/26 |
| 6,550,672 | B1 | * 4/2003 | Tracy et al. | 235/383 |
| 2001/0041561 | A1 | * 11/2001 | Ventulett et al. | 455/414 |
| 2002/0007306 | A1 | * 1/2002 | Granger et al. | 705/14 |
| 2002/0045456 | A1 | * 4/2002 | Obradovich | 455/457 |
| 2002/0057212 | A1 | * 5/2002 | Hamilton et al. | 340/988 |
| 2002/0077130 | A1 | * 6/2002 | Owensby | 455/466 |
| 2002/0102993 | A1 | * 8/2002 | Hendrey et al. | 455/456 |

* cited by examiner

PERSONALIZED PRESENTATION SYSTEM AND METHOD

This application claims the benefit under 35 U.S.C. § 119(e) of U.S. Provisional Application Ser. No. 60/227,053, entitled "Method and Apparatus for Presenting Information," filed Aug. 21, 2000.

TECHNICAL FIELD

The invention relates to personalized presentation systems and methods.

BACKGROUND

With dramatic improvements in communications technology, the ability of users to contact each other has become more convenient, and easy access to a larger variety of information at various sources is available over public networks, such as the World Wide Web. In addition to calls over traditional telephony networks, other types of communications are commonly used, including electronic mail, web browsing, text-based chat sessions, communication of streaming data such as audio and video data, and so forth.

In the entertainment industry, improvements in communications technology have translated into many new opportunities. For example, with television programming, data enhancements can be added so that users have access to supplemental or enhanced information associated with the programs they are viewing. Also, users can quickly and conveniently download streaming audio and video data onto their personal computing devices for viewing or listening. Generally, many forms of communicating information to user devices are available for amusement or other purposes. It is common for the originators of such communications to also provide some revenue-generating information, such as advertising information, for presentation on user devices. For example, enhancement data sent with television programming can include advertising information, and advertisement banners may be presented at websites.

However, many other opportunities remain unexploited, especially when users do not have ready access to personal computing devices with which to receive communications. For example, in an amusement park or other type of entertainment facility, visitors generally roam around to different points in the facility, with the sponsor or owner of the entertainment facility generally not aware of where each visitor is and the activities of such visitor. Revenues of such entertainment facilities are typically derived from admissions fees as well as purchases made by visitors at gift shops and food establishments within the entertainment facility. However, mechanisms for targeted opportunities for enhanced revenue based on user interests during visits to an entertainment or other facility have not been exploited.

SUMMARY

In general, according to one embodiment, a method of communications comprises determining a location of a user and sending information to present to the user on a presentation device in the proximity of the user based on the determined location.

Some embodiments of the invention may have one or more of the following advantages. User experience at entertainment or other facilities are enhanced by providing information based on the personalized interests of such users. Opportunities for enhanced revenue also exist by presenting various types of revenue-generating information, such as advertising information, to users based on where they are located in the facility.

Other features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
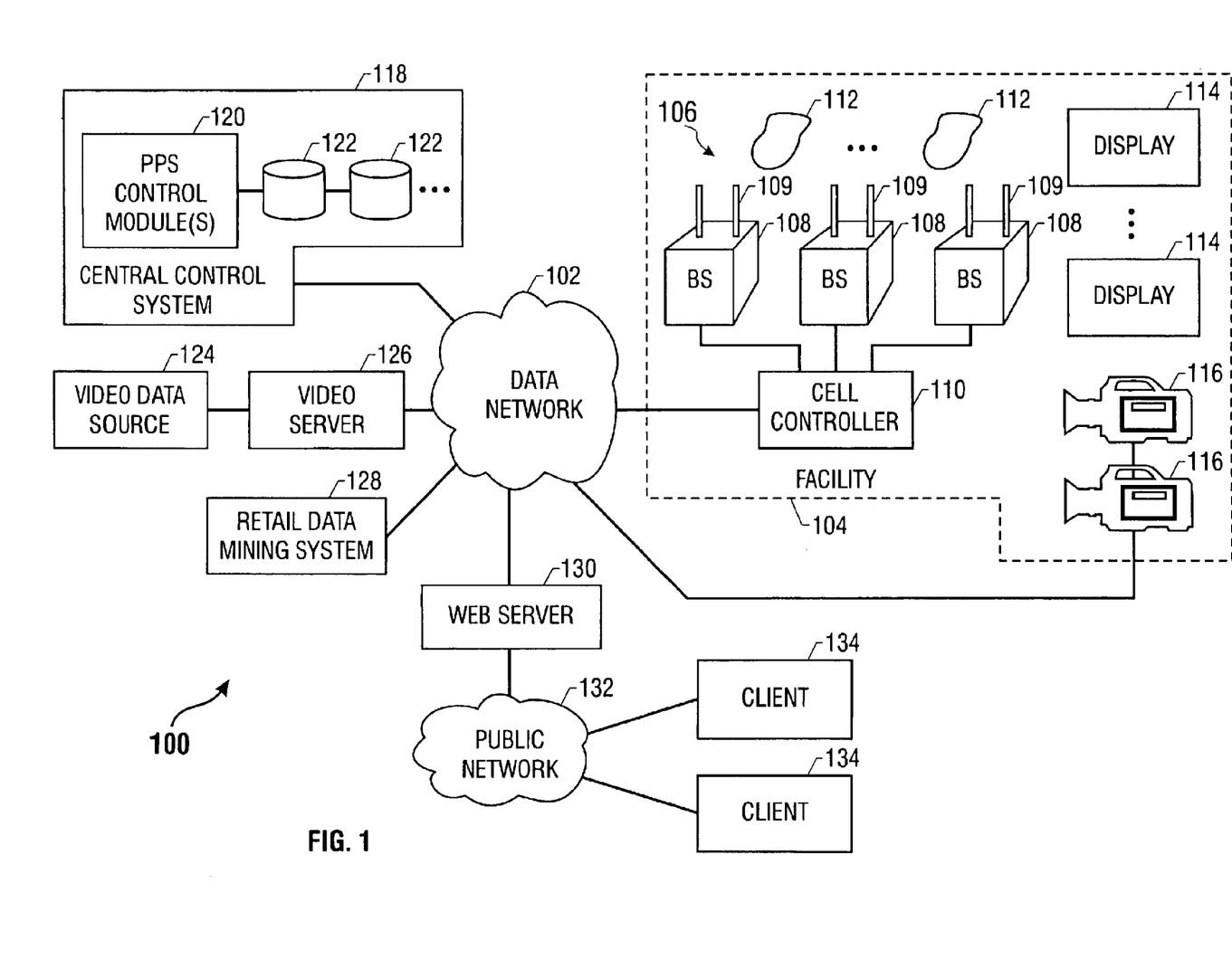
FIG. 1 is a block diagram of an embodiment of a communications system including an entertainment facility.

Referring to FIG. 1, a communications system 100 includes a data network 102 that is coupled to various network elements, including elements in an entertainment facility 104. Examples of the entertainment facility 104 include an amusement park or another type of facility designed to attract visitors. In further embodiments, instead of an entertainment facility, the facility 104 can be other types of facility, such as a business facility, educational facility, governmental facility, retail facility, or others. The data network 102 is also coupled to a central control system 118, which controls various components in the facility 104 and which receives information collected by such components in the facility 104.

Other network elements connected to the data network 102 include a video server 126 that, in response to requests, retrieves video information from a video data source 124 and communicates the video information over the data network 102. The video data source 124 also includes audio data that may be presented along with the video data. Another network element connected to the data network 102 is a web server 130, which may be provided by the same entity that owns the facility 104 and the central control system 118. The web server 130 allows remote users to gain access to the data network 102 to perform various tasks, including registration and performing virtual visits to the facility 104. The web server 130 is coupled to a public network 132, such as the Internet. Users gain access to the web server 130 over the public network 132 with client systems 134.

Another network element connected to the data network 102 is a retail data mining system 128, which receives retail information about users collected by the central control system 118 based on activities of users in the facility 104. Alternatively, instead of being connected to the data network 102, the retail data mining system 128 can also be coupled to the public network 132.

Examples of the data network 102 include a local area network (LAN), a wide area network (WAN), or a virtual private network (VPN). LANs and WANs are private networks that are protected against unauthorized public access. A VPN is generally implemented on a public network, such as the public network 132, but a security protocol is provided to prevent unauthorized access of data communicated between secure nodes over the public network. Physically, the data network 102 can be a wired network, a wireless network, a cable network, an optical network, or other types of networks. The data network 102 may also be a combination of some or all of the above listed types of networks.

The facility 104 includes base stations 108 (each with antennas 109) that are part of a local positioning system (LPS) 106 to track locations of users. Such users carry tags 112 that are detected by the antennas 109 and communicated back to a cell controller 110 by the base station 108.

Other components in the facility 104 include displays 114 and cameras 116 that are dispersed throughout the facility 104. In addition to displays 114, other types of presentation devices may be dispersed throughout the facility 104, such as speakers to provide audio output. The cameras 116 in one embodiment are 360° cameras that are capable of panning around a full circumference. In addition to the cameras 116, other types of input devices, such as microphones, may also be present in the facility.

Information collected by the LPS 106 and by the cameras 116 (and other input devices) are communicated back to the central control system 118, where various tasks in accordance with some embodiments of the invention may be performed as discussed below.

The central control system 118 includes one or more personalization platform solution (PPS) modules 120 for implementing various tasks according to some embodiments of the invention. The central control system 118 also includes storage devices 122 that store user-related information, such as profiles, user locations within the facility 104, and other information.

Figure 2:
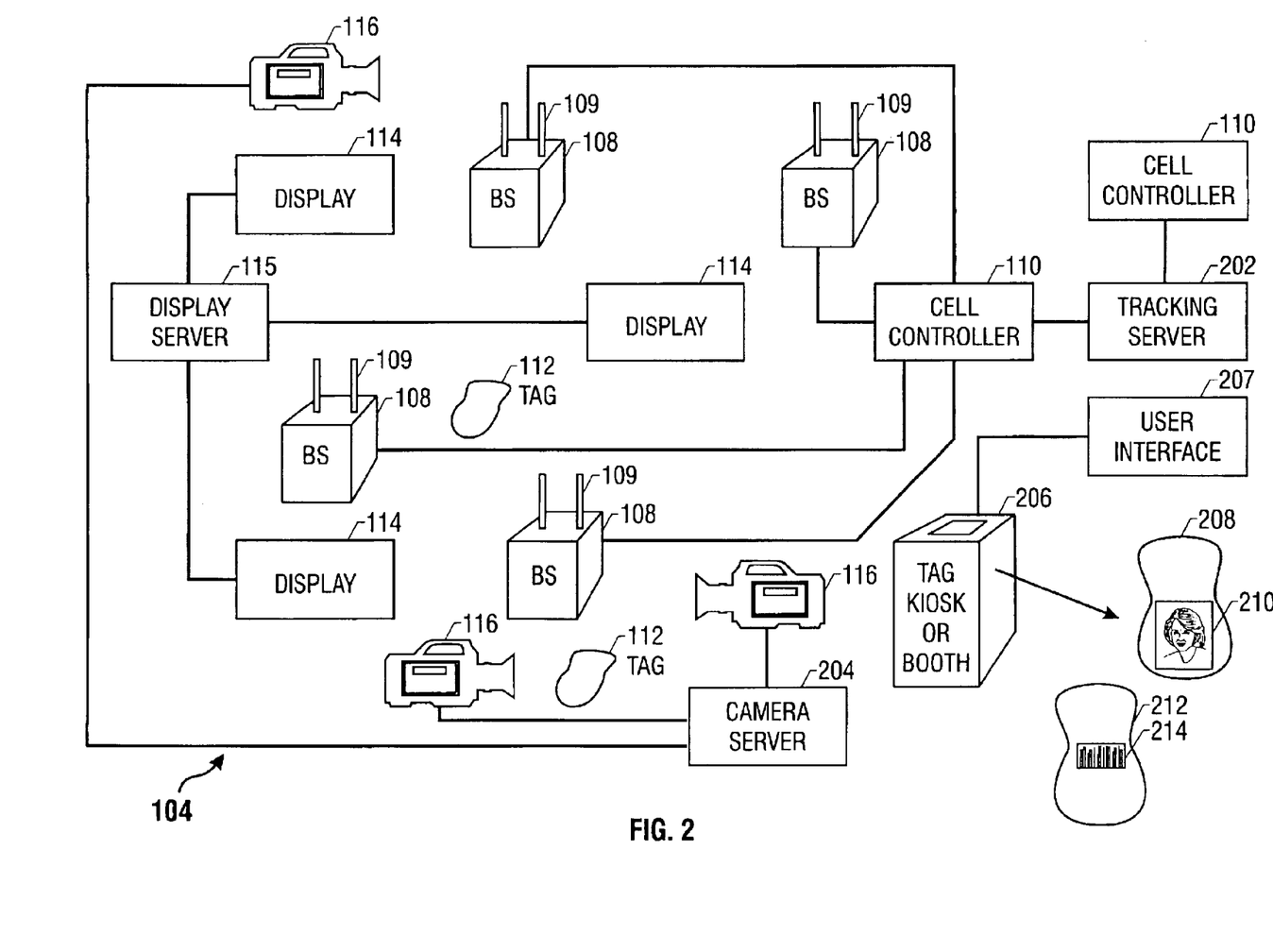
FIG. 2 is a block diagram of a system for tracking the location of a user in the entertainment facility and for presenting information to the user based on the user's location.

Referring to FIG. 2, the facility 104 is illustrated in greater detail. As shown, the base stations 108, displays 114, and cameras 116 are located at various different distributed locations. The base stations 108 are provided in a cellular arrangement in which each base station 108 communicates with tags 112 within its assigned cell. The base stations 108 transmit radio frequency (RF) or other forms of wireless signals in response to commands from the cell controller 110. The base stations 108 also receive signals transmitted by tags 112. The cell controller(s) 110 are connected to a tracking server 202 that communicates with the data network 102.

Also, the displays 114 are connected to a display server 115, with the display server 115 receiving information over the data network 102 to present on one or more of the displays 114 and/or other presentation devices. The cameras 116 are connected to a camera server 204, which communicates video images collected by the cameras 116 over the data network 102 to the central control system 118.

At one or more locations in the facility 104, tag kiosks or booths 206 are provided to enable users to pick up their individualized tags 112. Through a user interface 207 (e.g., a monitor and user input device such as a mouse or keyboard), a user can type in their account name and password, or enter some special code, to receive the individualized tag 112. In one example embodiment, each tag 112 may include a front side 208 that has a picture 210 of the user and a back side 212 that has some type of an identification label 214. Each tag 112 is relatively small in size and can easily be worn or carried by users. Alternatively, the tags can also be mounted on a personal digital assistant (PDA)-type device that is carried by a user.

To perform location tracking according to one embodiment, the cell controller 110 causes each base station 108 to transmit a signal through its antennas 109. When a tag 112 receives a signal sent by the antennas 109, the tag 112 transmits a response signal that includes the tag's serial number (or other type of identifier) and other information. When the signal emitted by a tag reaches the cell controller 110, the cell controller 110 can calculate the distance between that tag and the corresponding antennas 109 by measuring the delay between the transmission of the signal and reception of the signal from the tag 112. The cell controller 110 rapidly cycles among all connected base stations 108 and identifies tags that are in its radio range.

After calculating the distance between a base station 108 and the tags 112 within the base station's coverage area, the cell controller 110 sends the information to the tracking server 202. The tracking server 202 consolidates the information sent by all cell controllers 110 and calculates the positions of the tags being tracked. The tracking server 202 then communicates the consolidated information over the data network 102 to the central control system 118.

To enable outside parties to find a person within the facility 104, the web server 130 (FIG. 1) may include a finder application that enables the outside parties to search for tags by serial number, tag group, or location. The finder application may present location information in a real-time and dynamically updated form so that the outside parties may track movement of the tag.

Figure 3:
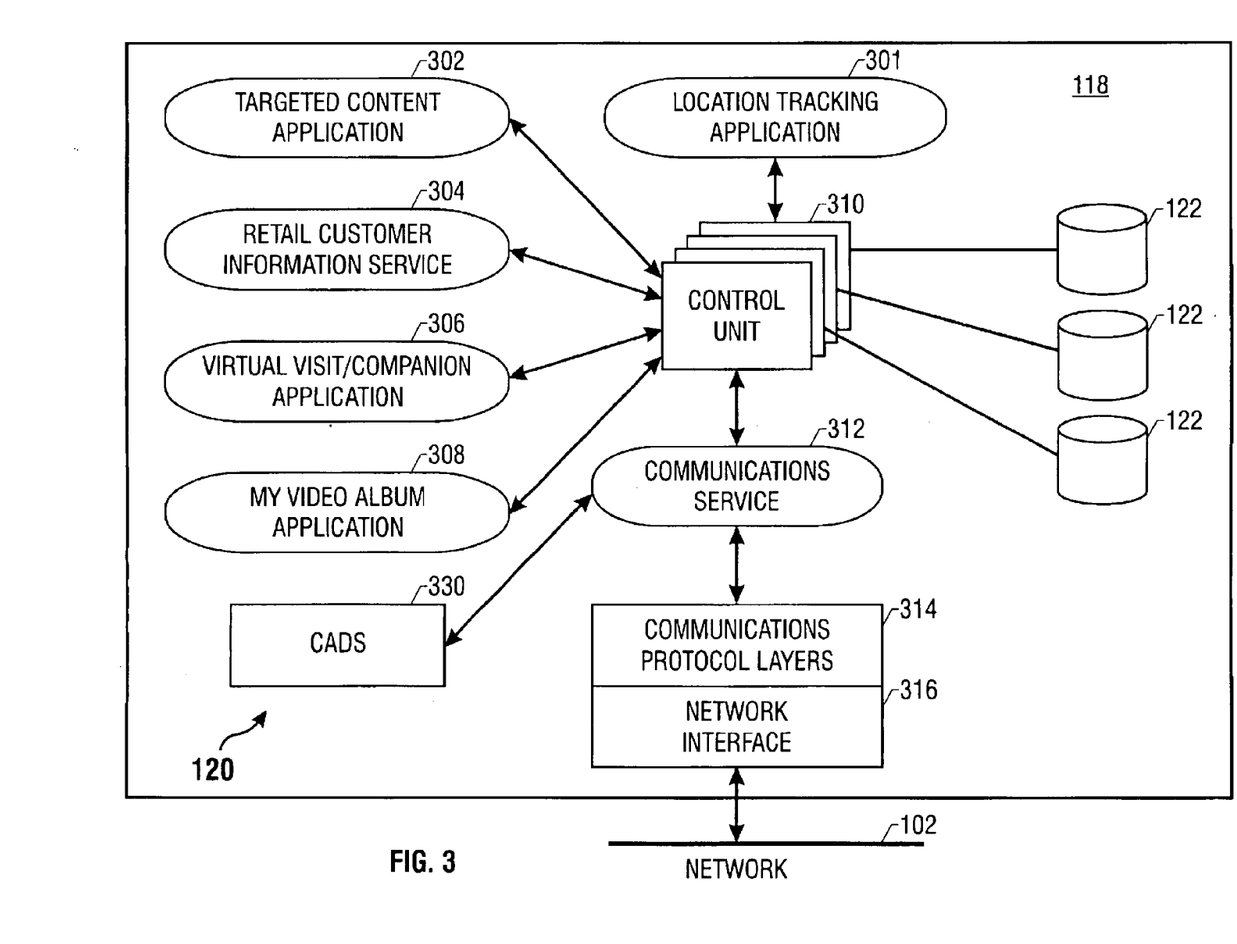
FIG. 3 is a block diagram of components of a central control system used in the communications system of FIG. 1.

Referring to FIG. 3, according to one embodiment, the PPS modules 120 in the central control system 118 include a location tracking application 301 (which receives information from the tracking server 202 (FIG. 2) for determining the location of users in the facility 104, a targeted content application 302, a retail customer information service 304, a virtual visit/companion application 306, and a "my video album" application 308. In the illustrated embodiment, the modules 302, 304, 306, and 308 are implemented as software routines that are executable on one or more control units 310, which are coupled to one or more storage units 122. The software routines can be executed in a single node with one or more control units 310, or alternatively, the routines can be executed in multiple nodes each with its own set of control units.

The modules 120 also include a content aggregation and distribution system (CADS) 330, which contains encoding stations, television broadcast distribution servers, ad-splicing systems, content scheduling applications, and components for delivering content to the facility 104 over the data network 102. Video and other input data received from the facility 104 (e.g., from cameras 116) are also aggregated by the CADS 330 for broadcast to a predetermined remote location. In one embodiment, the targeted content application 302 works with the CADS 330 to deliver targeted content (such as advertising information) to users visiting the facility 104.

Communications between the various modules and the network 102 occur through a communications service 312, communications protocol layers 314, and a network interface 316. Examples of the communications protocol layers 314 include an Internet Protocol (IP) network layer and a Transmission Control Protocol (TCP) or User Datagram Protocol (UDP) transport layer. One version of IP is described in Request for Comments (RFC) 791, entitled "Internet Protocol," dated September 1981. Another version of IP is described in RFC 2460, entitled "Internet Protocol Version 6 (IPv6) Specification," dated December 1998. TCP is described in RFC 793, entitled "Transmission Control Protocol," dated September 1981. UDP is described in RFC 768, entitled "User Datagram Protocol," dated August 1980.

Examples of the communications service 312 includes a Hypertext Transfer Protocol (HTTP) service. An HTTP service generates HTTP requests as well as receives HTTP responses over the data network 102. HTTP is described in RFC 2068 entitled "Hypertext Transfer Protocol-HTTP/1.1," dated January 1997. In further embodiments, the communications service 312 can be another type of service.

Users can register their profiles with the central control system 118 in one of several ways. The users may pre-register by using client systems 134 to register through the web server 130 over the public network 132. To encourage such registration, an affinity program may be implemented in which the user is provided incentives to furnish detailed information about their interests and personal information. Such an affinity program may include discounts for retail purchases, free admissions to various events, and other incentive programs. Instead of remote registration, registration may also occur when the user visits the facility 104. Thus, before a user can collect a tag 112, the user may be required to submit his or her personal information. Entry of the registration information may be performed through the user interface 207 (FIG. 2) at a tag kiosk or booth 206. The registered profile of the user is then communicated for storage in the central control system 118.

Examples of the types of information that are stored in a user profile include a person's age, gender, language, personal income, movie and music interests, profession, educational level, types of products or services that the user may be currently in the market for, hobbies, and so forth. If a user is unwilling to provide some of the detailed personal information, a default profile can be assigned, with the profile updated based on subsequent user activities, including visits to retail outlets, purchasing habits, and so forth. By updating user profiles based on their behavior and activities, more personalized experiences may be provided to users.

Figure 4:
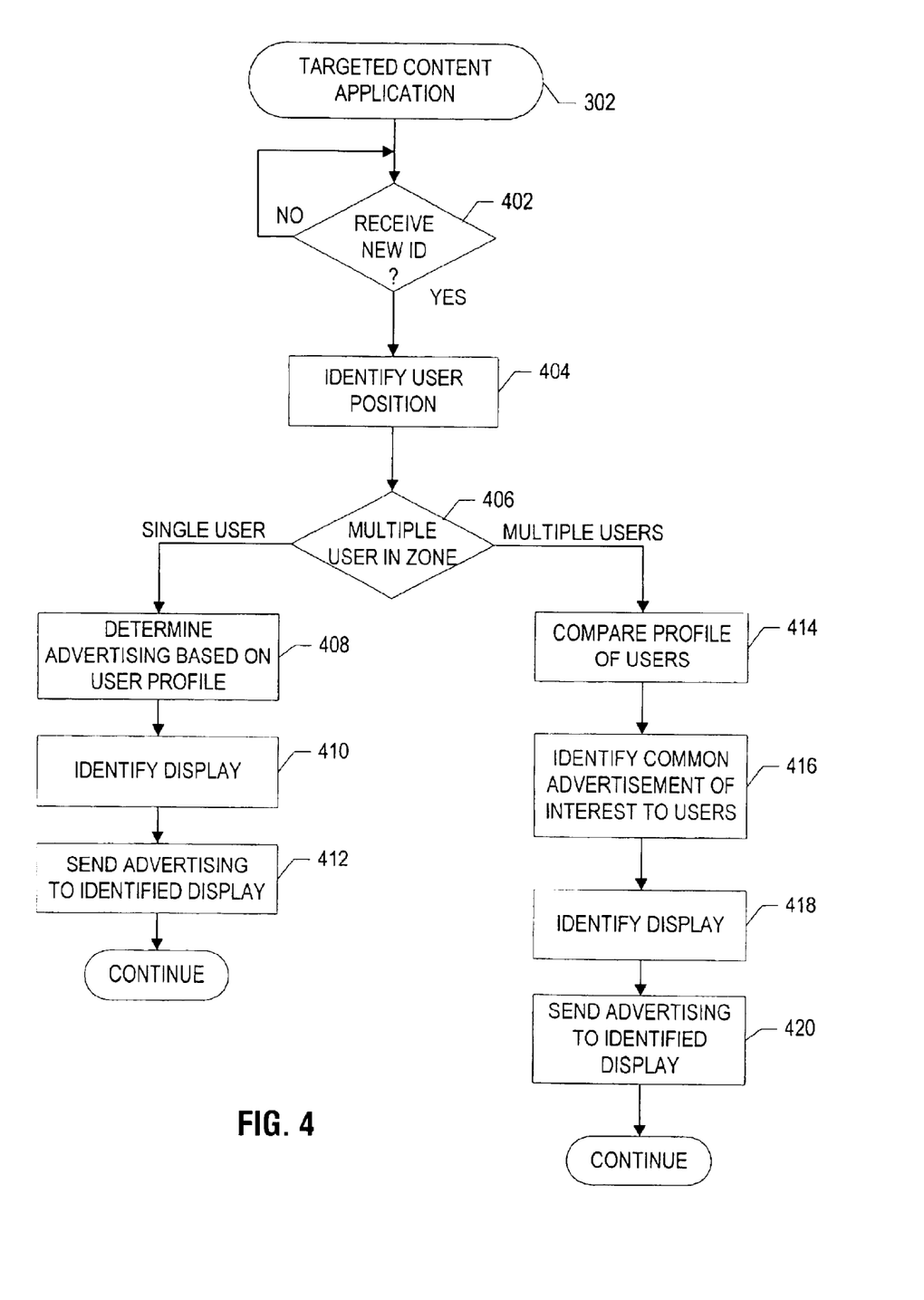
FIG. 4 is a flow diagram of a process performed by a targeted content application executable in the central control system of FIG. 1.

Once the user picks up his or her tag, the LPS 106 tracks the location of the user as the user roams about the facility 104. Referring to FIG. 4, the targeted content application executable in the central control system 118 determines if a new ID has been received (at 402), which indicates that a new user has entered the facility 104. If so, the targeted content application 302 identifies the position of the user (404), who is free to roam about the facility 104. The location information is communicated to the targeted content application 302 by the location tracking application 301. The targeted content application 302 actually identifies positions of all users in the facility 104, so that the targeted content application 302 is aware of the locations of the users at all times.

In one embodiment, the facility 104 is divided into plural zones, with each zone associated with a different display 114. The targeted content application 302 then determines (at 406) if there are multiple users in a given zone. If there is just a single user in the zone, then the targeted content application 302 determines (at 408) the type of advertisement (or other type of information) that may be of interest to the user based on the user's profile. The user may have specified his or her interests in various types of retail products or services. Based on such user interests, the targeted content application 302 can identify the type of advertisement (or other information) that should be presented to the user.

Next, the targeted content application identifies (at 410) the display 114 (or other presentation device) in the given zone. The targeted content application 302 then causes (at 412) the advertising or other information to be sent over the data network 102 to the display server 115 (FIG. 2), which forwards the information to the appropriate one of the displays 14 (or other presentation device). The advertising or other information may be stored locally on one of the storage units 122 in the central control system 118. Alternatively, the advertising or other information may be stored in the video data source 124, in which case the targeted content application 302 sends a request to the video server 126 to retrieve the desired information and to communicate the information over the data network 102 to the targeted display 114.

If the targeted content application 302 determines (at 406) that there are multiple users in the given zone, then the targeted content application 302 compares (at 414) the profiles of the multiple users. The targeted content application 302 will attempt to identify (at 416) common advertising or other information that may be of interest to the multiple users. The targeted content application 302 then identifies (at 418) the display 116 in the given zone, and causes (at 420) the advertising or other information to be communicated to the identified display.

The identification of common information of interest to multiple users may be based on heuristic algorithms or voting schemes. For example, common interests may include hobbies, demographics, preferences, culture, language, and so forth.

In addition to identifying the type of product or service and its source, the advertisement information may also specify where the advertised product or service may be available within the facility 104. Alternatively, the advertisement information may be provided purely as an informational service so that the users are reminded of the advertised product or service that is generally available outside the facility 104. A benefit to retailers is that targeted advertisements (or other types of information) to individuals or groups of users in the facility 104 increase the likelihood that the users will purchase the advertised product or service. A benefit to the provider of the facility 104 is incremental advertisement revenue, both in terms of increased purchases within the facility 104 and advertisement revenue charged to retail sources that have agreed to have their product or service advertised in the facility 104.

Figure 5:
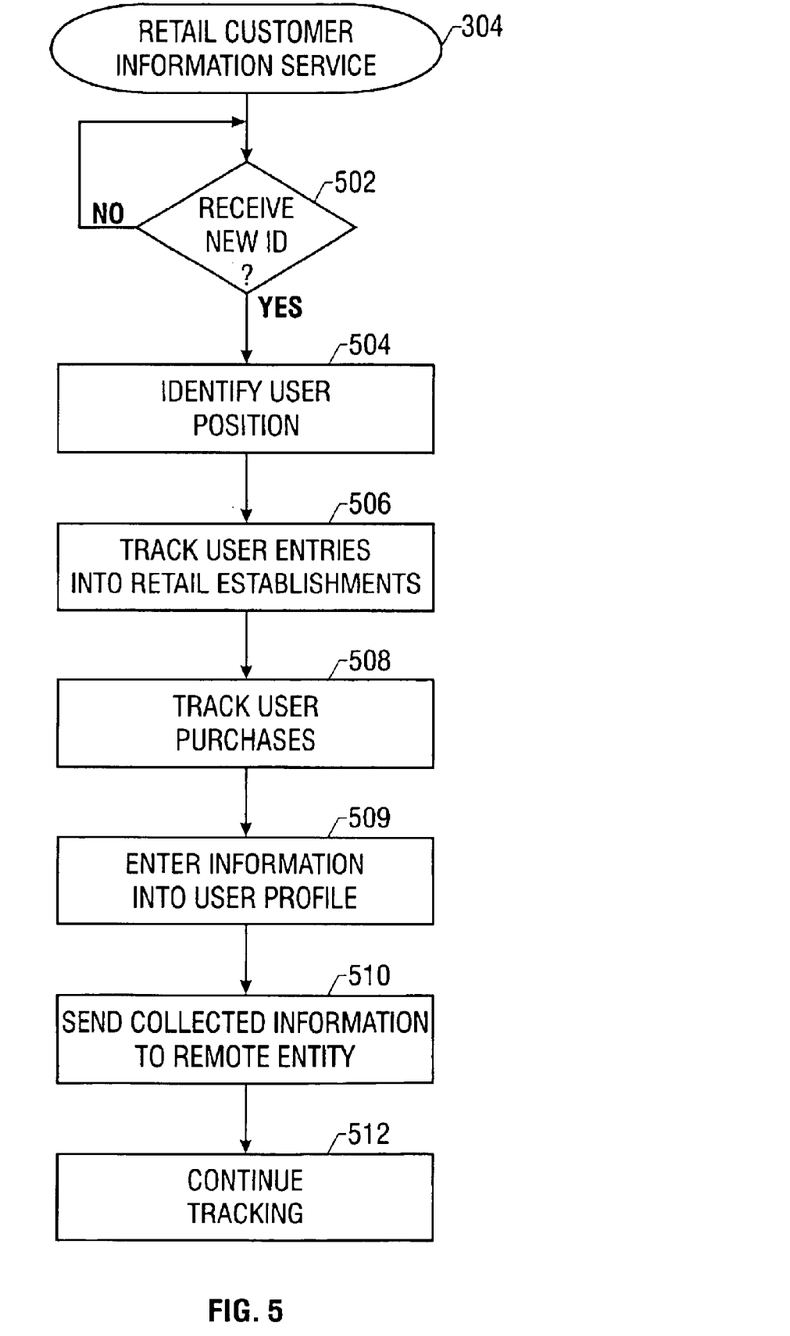
FIG. 5 is a flow diagram of a process performed by a retail customer information service executable in the central control system of FIG. 1.

Referring to FIG. 5, the retail customer information service 304 is used to collect profile information of users based on their activities within the facility 104. The retail customer information service 304 determines if a new ID has been received (at 502), indicating that a new user has entered the facility 104. Again, the retail customer information service 304 is designed to identify locations of all users within the facility 104 (by accessing the location tracking application 301). The position of each user is identified (at 504) so that the retail customer information service 304 can determine when a user has entered into a retail establishment (e.g., gift shop, food establishment, etc.). User visits to each retail establishment, and the duration of each visit, are logged. Also, if the user makes any purchase, such purchases are tracked (at 508). The tracked information can be used to update the user's profile (at 509) based on activities in the facility 104. Also, the collected information may be communicated to a remote retail entity (at 510), such as the retail data mining system 128 (FIG. 1) or retailers who have expressed interest in receiving such data. The retail customer information service 304 then continues (at 512) to track the activities of various users in the facility 104.

Depending on the application, the collected information may be communicated on a relatively real-time basis or the information may be collected over some period of time (e.g., days) before being communicated to the retail entity.

Another feature that is available includes giving visitors of the facility 104 the ability to scan items that they would like to purchase. By doing so, the users can avoid carrying around purchased items during their visit. The purchased items may be picked up at some predetermined location when the user is ready to leave.

Figure 6:
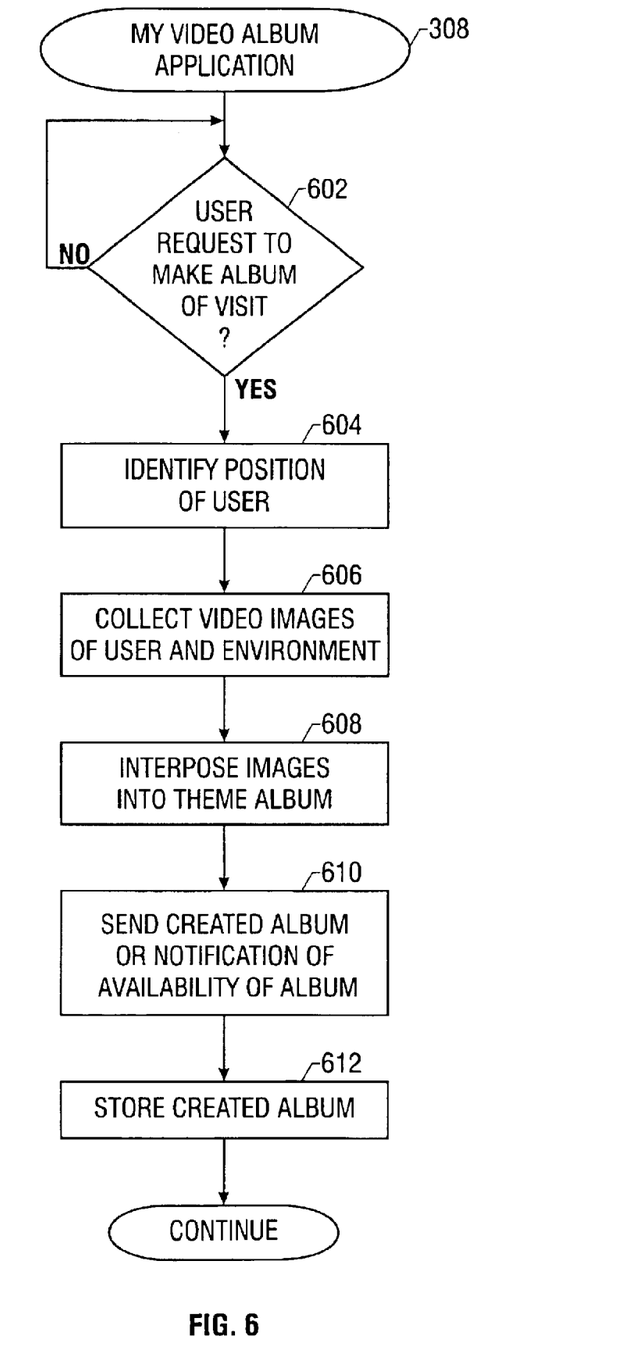
FIG. 6 is a flow diagram of a process performed by a video album application executable in the central control system of FIG. 1.

Another service that can be provided by the central control system 118 is the creation of a video album of what the user did in the facility 104. Referring to FIG. 6, this is performed by the my video album application 308. The my video album application 308 determines (at 602) if a user has requested that an album be made of the visit. When registering, the user may indicate that he or she is interested in such video albums. The user may also be given the option of selecting the creations of such an album when he or she collects his or her tag 112 upon entry into the facility 104. Alternatively, the my video album application 308 will create the video album regardless of whether the user has expressed interest or not, in the hope that the user will purchase the video album once he or she learns that the video album has been created.

The my video album application 308 identifies the position of each user (at 604) from the location tracking application 301. Then, through the various cameras 116 in the facility 104, the my video album application 308 collects (at 606) video images of the user and the user's environment as the user roams about the facility 104. Optionally, the collected images of the user and the user environment may be interposed (at 608) into a pre-existing theme album. The theme album may be about the facility 104 that provides a description of the various points of interest within the facility 104 and a history of the facility 104. The video images of the users visit are then combined with the theme album so that a more personalized album is provided.

A copy of the video album can also be sent (at 610) to a predetermined location that has been selected by a user. For example, the user may ask that the video album (which may recorded on a compact disk or digital video disk) be mailed to him or her. Alternatively, the my video album application 308 may send some type of a notification, such as by electronic mail, that the video album is available. The created video album is stored (at 612) for future access.

In addition to the various services that are based on a user's actual visit to the facility 104, another service that the central control system 118 is able to provide is virtual visits to the facility 104. The virtual visit/companion application 306 enables a user to visit a facility 104 from a remote location, such as from one of the client systems 134 (FIG. 1). The user is also able to accompany a companion that is physically located at the facility 104. This companion may be someone that the user knows personally, or alternatively, the companion may be a participating celebrity.

Figure 7:
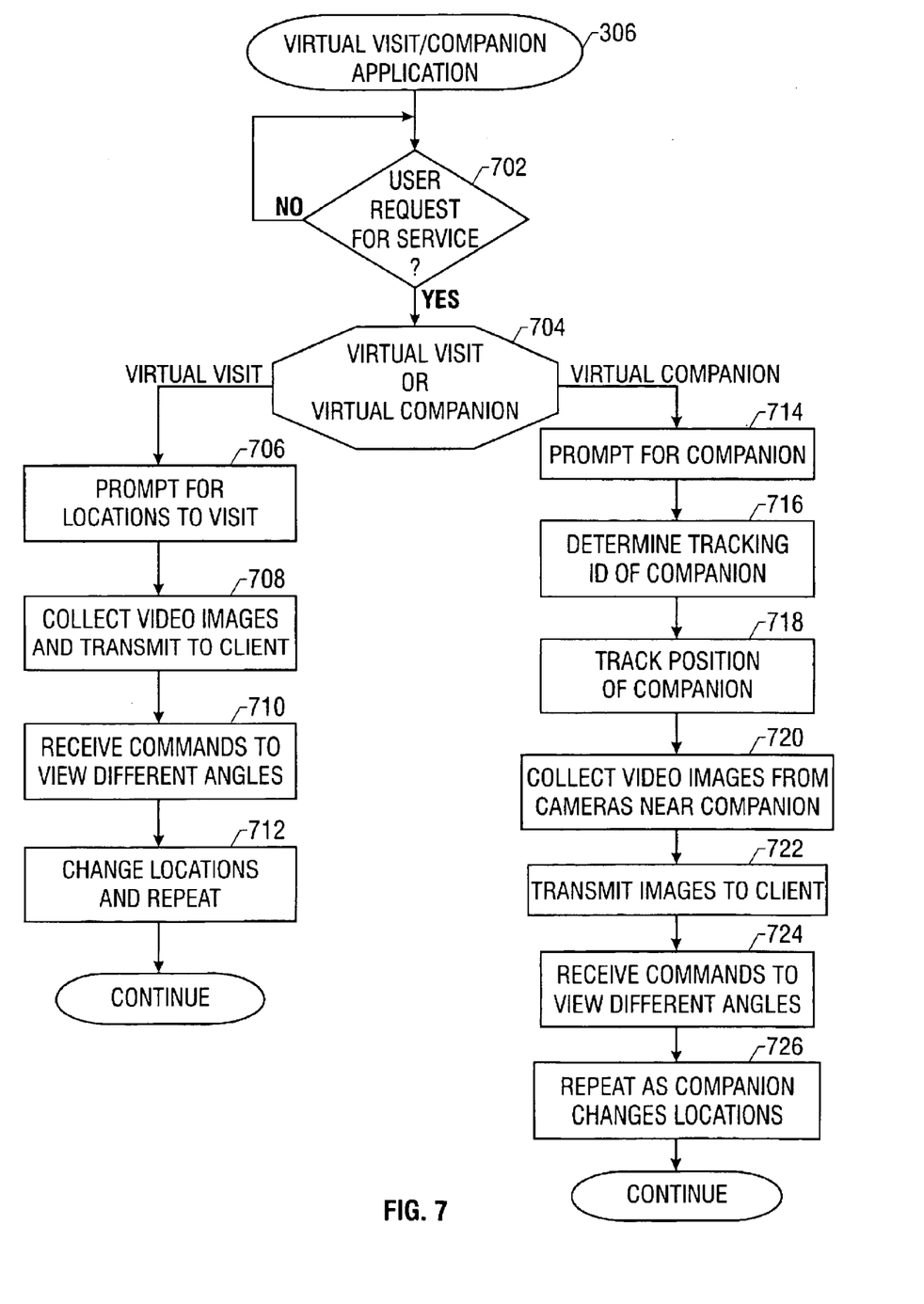
FIG. 7 is a flow diagram of a process performed by a virtual visit/companion application executable in the central control system of FIG. 1.

Referring to FIG. 7, the virtual visit/companion application 306 first determines (at 702) if a user request for such a service has been received. The application 306 then determines (at 704) if the requested service is a virtual visit or a virtual companion service. If a virtual visit is required, then the application 306 prompts (at 706) the user for locations that the user desires to visit within the facility 104. The user may select locations from a list, or alternatively, the user may choose a "No Preference" option in which case the application 306 will take the user on a default virtual tour. Based on the selected locations, the application 306 activates cameras 116 in the vicinity of the locations of interest and transmits (at 708) collected video images to the client system 134 for viewing by the user. Audio may also be collected to enhance the realism of the virtual visit.

The video images collected by the 360° cameras 116 provide a 360° view. The user may issue a request to select a desired angle to view. When the application 306 receives such requests (at 710), the application 306 retrieves the selected angle for presentation to the user. The virtual visit/companion application 306 then changes locations (at 712) by switching to a different camera 116 to proceed to the next point of interest.

If the service requested by the user is a virtual companion service, then the application 306 prompts (at 714) for the identity of the companion. The companion may be someone that the user personally knows, or alternatively, the companion may be a celebrity. In either case, the companion is associated with a tag ID, which is determined (at 716) based on the identification of the companion provided by the user. The position of the companion is then tracked (at 718) by the application 306. Based on the position of the companion, video images and audio data associated with the companion and the environment around the companion are collected (at 720) by a camera 116 and transmitted (at 722) back to the client system for wing by the user. If requests to change the viewing angle are received (at 724) from the remote user, the application 306 responds accordingly. The above process is repeated (at 726) as the companion changes locations.

The various software routines or modules described herein, such as applications 302, 304, 306, and 308 may be executable on control units (such as control units 310 in the central control system 118). Each control unit may include a microprocessor, a microcontroller, a processor card (including one or more microprocessors or microcontrollers), or other control or computing devices. As used here, a "controller" refers to either software or hardware, or a combination of the two.

The storage devices referred to herein may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs), digital video disks (DVDs), or optical disks. Instructions that make up the various software routines or modules may be stored in respective storage devices. The instructions when executed by a respective control unit cause the corresponding system to perform programmed acts.

The instructions of the software routines or modules may be loaded or transported to the corresponding system in one of many different ways. For example, code segments including instructions stored on floppy disks, CD or DVD media, a hard disk, or transported through a network interface card, modem, or other interface device may be loaded into the system and executed as corresponding software routines or modules. In the loading or transport process, data signals that are embodied in carrier waves (transmitted over telephone lines, network lines, wireless links, cables, and the like) may communicate the code segments, including instructions, to the system. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of communications in a geographic region having a plurality of fixed presentation devices that are located at respective fixed positions, comprising:
   determining a location of a user;
   sending information to present to the user on one of the fixed presentation devices in the proximity of the user based on the determined location;
   determining from a user profile advertising information of interest to the user,
   wherein sending the information comprises sending the advertising information of interest to the user based on the user profile; and
   updating the user profile based on actions of the user, wherein determining the advertising information of interest to the user is based on the updated user profile;
   wherein updating the user profile comprises updating based on retail purchasing actions of the user, wherein determining the advertising information of interest to the user is based on the user profile updated based on retail purchasing actions of the user.

2. The method of claim 1, wherein determining the location of the user comprises using information from a local tracking system within the geographic region.

3. The method of claim 1, wherein determining the location of the user comprises determining the location within a facility.

4. The method of claim 1, wherein determining the location is based on a location of a tracking device.

5. The method of claim 4, wherein determining the location is based on communication of signals between the tracking device and a network of antennas.

6. The method of claim 4, wherein sending the information comprises sending information to present on a presentation device separate from the tracking device.

7. The method of claim 1, further comprising:
   determining a location of at least another user; and
   determining one or more common interests of the users;
   wherein sending the information comprises sending information based on the one or more common interests.

8. The method of claim 1, further comprising receiving data collected from one or more input devices of activities of the user.

9. The method of claim 8, wherein receiving the data comprises receiving data collected from one or more input devices in the proximity of the user.

10. The method of claim 8, wherein receiving the data comprises receiving data collected using one or more video cameras.

11. The method of claim 10, further comprising storing the received data collected by the one or more video cameras in a video album that is accessible by the user.

12. The method of claim 1, wherein updating the user profile based on retail purchasing actions of the user comprises updating the user profile based on retail purchasing actions of the user in a facility, and
   wherein sending the advertising information based on the user profile comprises sending the advertising information to present to the user on one of the fixed presentation devices in the facility.

13. A system for controlling communications in a geographic region having a plurality of fixed presentation devices that are located at respective fixed positions, comprising:
   a controller adapted to retrieve information relating to a location of a user and to communicate information to present on one of the fixed presentation devices in the proximity of the user as determined by the location information,
   wherein the controller is adapted to retrieve a user profile associated with the user, the communicated information based on the user profile,
   wherein the information to present on the one of the fixed presentation devices comprises advertising information targeted to an interest of the user based on the user profile,
   wherein the controller is adapted to update the user profile based on purchasing activities of the user in the facility, and to present the advertising information on one of the fixed presentation devices in the facility based on the user profile updated based on purchasing activities of the user in the facility.

14. The system of claim 13, wherein the information to present on the one of the fixed presentation devices comprises one of video data and image data.

15. The system of claim 13, wherein the controller is adapted to retrieve the location information from a location tracking system having a plurality of antennas covering different areas.

16. The system of claim 15, wherein the location information is based on communication between one or more of the antennas and a tracking device carried by the user.

17. The system of claim 13, wherein the controller is adapted to retrieve location information of a plurality of users.

18. The system of claim 17, wherein the controller is adapted to communicate information based on one or more common interests of the plurality of users.

19. The system of claim 13, wherein the location information identifies the location of the user in a facility selected from the group consisting of an entertainment facility, a retail facility, a business facility, an educational facility, and a governmental facility.

20. The system of claim 13, further comprising an interface adapted to communicate over a network with a subsystem comprising the device.

21. A data signal embodied in a carrier wave and containing instructions that when executed cause a system to:
   track a location of a user as the user changes location;
   receive video data collected from plural cameras in the proximity of the user based on tracking the location of the user, the received video data including video images of the user as the user roams about locations in a facility, including locations away from an entrance and exit of the facility;

store the video images of the user roaming about locations in the facility, including locations away from the entrance and exit of the facility, in a video album; and send a notification to the user that the video album is available to the user.

22. The data signal of claim 21, wherein the instructions when executed cause the system to collect video images of the user as the user performs various activities, and to store the collected video images into the video album.

23. The data signal of claim 22, wherein tracking the location of the user comprises tracking the location of the user based on tracking a tag carried by the user.

24. A system comprising:
a controller adapted to identify a location of a person and to receive video images of at least one of the person and an environment in the proximity of the person,
the controller adapted to communicate the received video images to a remote node, and
a sub-system to track the location of the person, the controller adapted to receive video images from different ones of a plurality of video cameras based on tracking the person,
the controller adapted to receive an indication that the person has registered to have a video album created,
the controller adapted to create the video album containing the received video images in response to the indication that the person has registered to have the video album created,
the controller adapted to further send a notification to the person that the video album is available to the person.

25. The system of claim 24, wherein the controller is adapted to create the video album by interposing the received video images into a pre-existing theme album containing a description of various points of interest within a facility being visited by the person.

26. An article comprising at least one storage medium containing instructions that when executed cause a system to:
identify a location of a user within a predetermined geographic region;
send information to one of plural fixed presentation devices located at respective fixed locations in the geographic region, the one fixed presentation device selected based on the location of the user, the information containing advertising information of interest to the user based on a user profile of the user;
track activities of the user; and
update the user profile based on the tracked activities;
wherein sending the advertising information comprises sending advertising information of interest to the user based on the updated user profile,
wherein the instructions when executed cause the system to update the user profile based on purchasing activities of the user.

27. The article of claim 26, wherein the user profile is updated based on purchasing activities of the user in a facility, and the advertising information sent comprises advertising information of interest to the user based on the user profile updated based on the purchasing activities of the user in the facility.

28. A method of communications in a geographic region having a plurality of fixed presentation devices that are located at respective fixed positions, comprising:
determining a location of a user;
sending information to present to the user on one of the fixed presentation devices in the proximity of the user based on the determined location;
determining from a user profile advertising information of interest to the user;
wherein sending the information comprises sending the advertising information of interest to the user based on the user profile;
developing the user profile based on activities of the user within a facility and based on video images of the user collected by video cameras in the facility; and
tailoring the advertising information to be sent to the user based on the developed user profile;
wherein sending the advertising information comprises sending the tailored advertising information to one of the fixed presentation devices in the proximity of the user based on the determined location of the user.

29. A system for controlling communications in a geographic region having a plurality of fixed presentation devices that are located at respective fixed positions, comprising:
a controller adapted to retrieve information relating to a location of a user and to communicate information to present on one of the fixed presentation devices in the proximity of the user as determined by the location information,
wherein the controller is adapted to retrieve a user profile associated with the user, the communicated information based on the user profile,
wherein the information to present on the one of the fixed presentation devices comprises advertising information targeted to an interest of the user based on the user profile,
wherein the controller is adapted to:
develop the user profile based on activities of the user within a facility and based on video images of the user collected by video cameras in the facility; and
tailor the advertising information to be sent to the user based on the developed user profile,
wherein the advertising information sent to present on one of the fixed presentation devices in the proximity of the user as determined by the location information includes the tailored advertising information.

30. An article comprising at least one storage medium containing instructions that when executed cause a system to:
identify a location of a user within a predetermined geographic region;
send information to one of plural fixed presentation devices located at respective fixed locations in the geographic region, the one fixed presentation device selected based on the location of the user;
the information containing advertising information of interest to the user based on a user profile of the user;
develop the user profile based on activities of the user within a facility and based on video images of the user collected by video cameras in the facility; and
tailor the advertising information to be sent to the user based on the developed user profile,
wherein sending the advertising information comprises sending the tailored advertising information to one of the fixed presentation devices in the proximity of the user based on the determined location of the user.

* * * * *